(12) United States Patent
Ishitobi et al.

(10) Patent No.: US 8,177,285 B2
(45) Date of Patent: May 15, 2012

(54) AUTOMOTIVE DOOR WITH ENHANCED SIDE COLLISION PERFORMANCE

(75) Inventors: Hideki Ishitobi, Shinagawa-ku (JP); Haruyuki Konishi, Kobe (JP)

(73) Assignee: Kobe Steel, Ltd., Kobe-Shi (JP)

( * ) Notice: Subject to any disclaimer, the term of this patent is extended or adjusted under 35 U.S.C. 154(b) by 0 days.

(21) Appl. No.: 13/089,000

(22) Filed: Apr. 18, 2011

(65) Prior Publication Data

US 2011/0210575 A1  Sep. 1, 2011

Related U.S. Application Data

(63) Continuation of application No. 12/530,061, filed as application No. PCT/JP2008/054613 on Mar. 13, 2008, now abandoned.

(30) Foreign Application Priority Data

Mar. 30, 2007 (JP) ................................ 2007-095765
Jul. 30, 2007 (JP) ................................ 2007-197938

(51) Int. Cl. B60J 7/00 (2006.01)
(52) U.S. Cl. ............................... 296/146.6; 296/187.12
(58) Field of Classification Search ............... 296/146.6, 296/187.12
See application file for complete search history.

(56) References Cited

U.S. PATENT DOCUMENTS

| 5,470,125 | A | 11/1995 | Yamazaki | |
| 5,536,060 | A | 7/1996 | Rashid et al. | |
| 5,599,057 | A * | 2/1997 | Hirahara et al. | 296/146.6 |
| 5,813,719 | A * | 9/1998 | Kowalski | 296/146.6 |
| 6,033,011 | A | 3/2000 | Kim | |
| 7,631,925 | B2 | 12/2009 | Tanaka et al. | |
| 2002/0171260 | A1 | 11/2002 | Schneider | |
| 2004/0216387 | A1 | 11/2004 | Furuse | |
| 2005/0231002 | A1* | 10/2005 | Klatt et al. | 296/146.6 |

FOREIGN PATENT DOCUMENTS

| JP | 50 43422 | 5/1975 |
| JP | 57-151427 | 9/1982 |
| JP | 59-34921 | 2/1984 |
| JP | 62 108076 | 7/1987 |
| JP | 4-67514 | 6/1992 |

(Continued)

OTHER PUBLICATIONS

Office Action issued on Aug. 15, 2011 in the corresponding Korean Patent Application No. 2009-7020376 (with English Translation).

Primary Examiner — Joseph Pape
(74) Attorney, Agent, or Firm — Oblon, Spivak, McClelland, Maier & Neustadt, L.L.P.

(57) ABSTRACT

The present invention provides an automotive door enhanced with the absorption performance for the collision energy in the side collision. The automotive door constructed of an outer panel and an inner panel, comprising a door beam for a side collision therewithin, and provided with a glass ascending/descending space between the inner panel and the door beam for a side collision comprises a reinforcing panel disposed in a space between the outer panel and the glass ascending/descending space and joined with both of the outer panel and the door beam for a side collision.

5 Claims, 14 Drawing Sheets

FOREIGN PATENT DOCUMENTS

| | | |
|---|---|---|
| JP | 4 67514 | 6/1992 |
| JP | 6 255365 | 9/1994 |
| JP | 8 216684 | 8/1996 |
| JP | 8 238932 | 9/1996 |
| JP | 10 305731 | 11/1998 |
| JP | 11 264044 | 9/1999 |
| JP | 2001 71038 | 3/2001 |
| JP | 2001 287608 | 10/2001 |
| JP | 2005 41353 | 2/2005 |
| JP | 2005 306236 | 11/2005 |
| KR | 1997-0035088 | 7/1997 |
| KR | 1998-020065 | 6/1998 |

\* cited by examiner

FIG.2
(a)
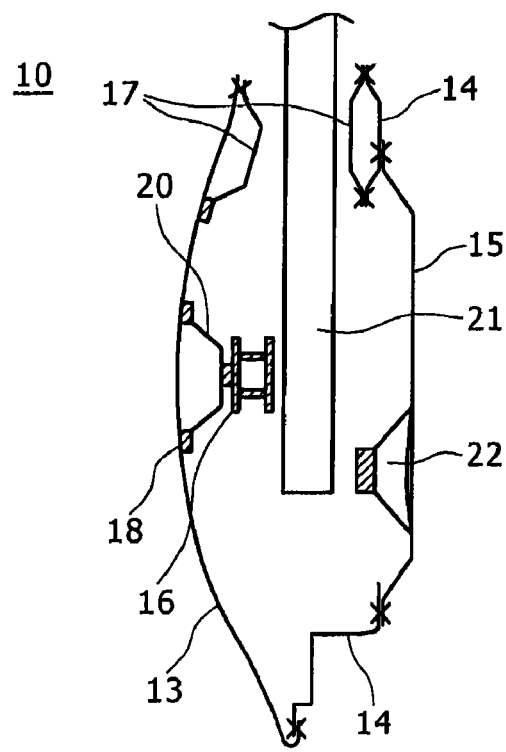
(b)
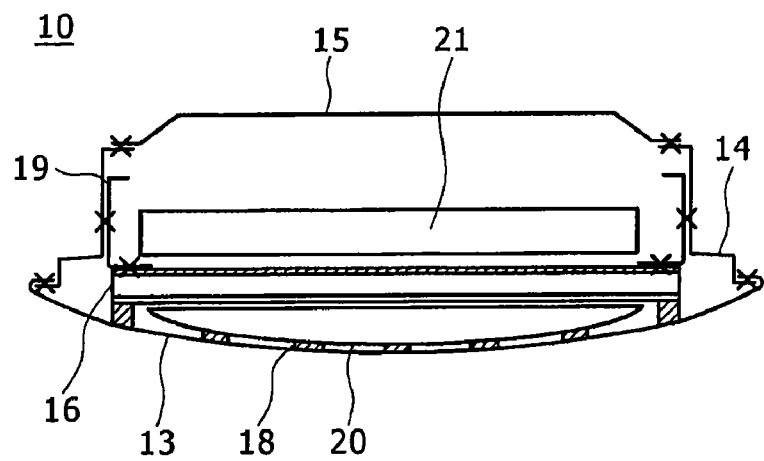

FIG. 4
(a)
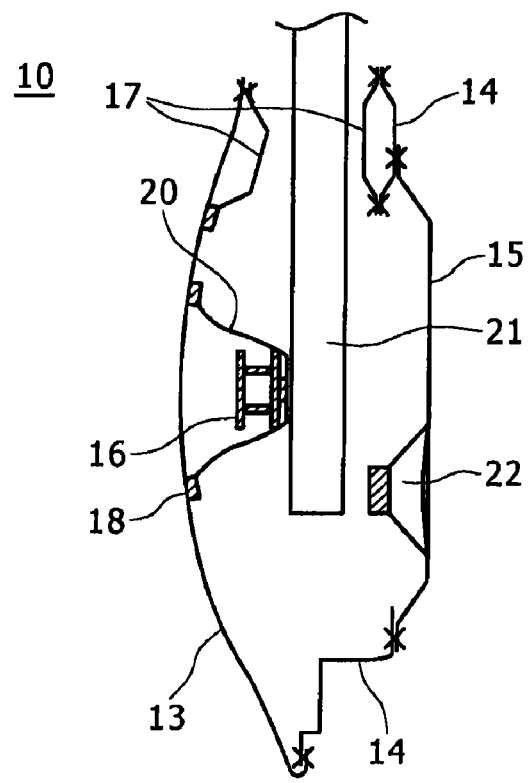
(b)
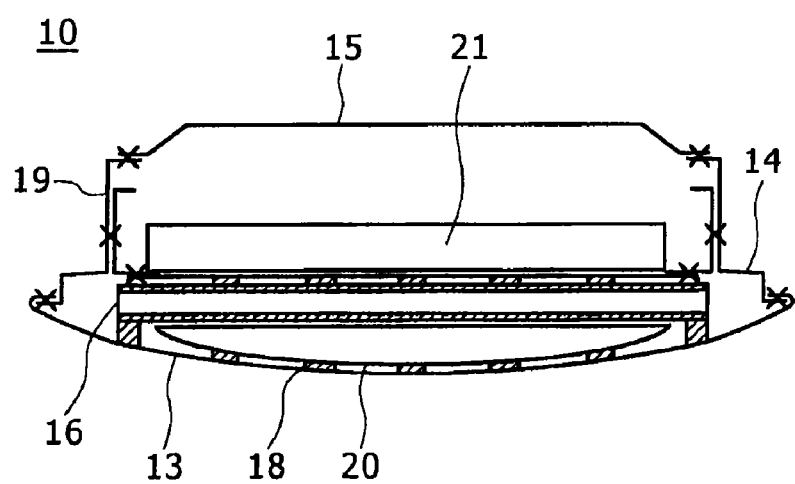

FIG. 5
(a)
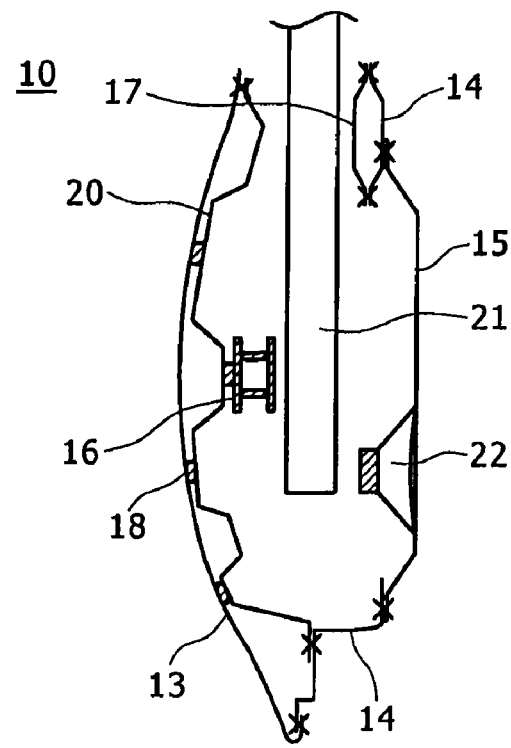
(b)
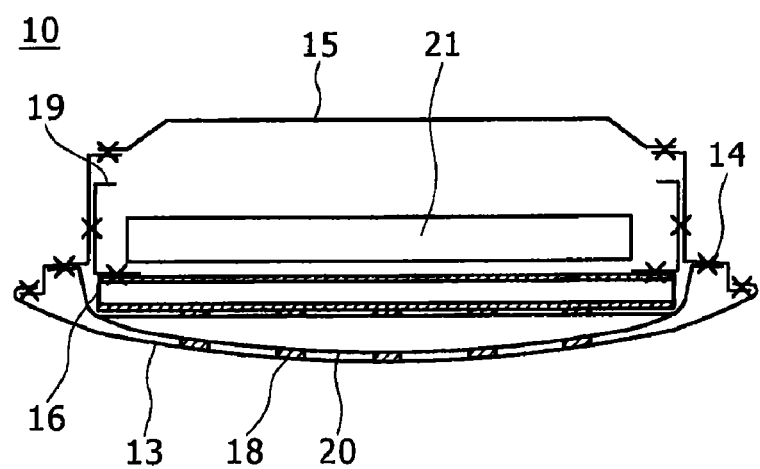

FIG. 6
(a)
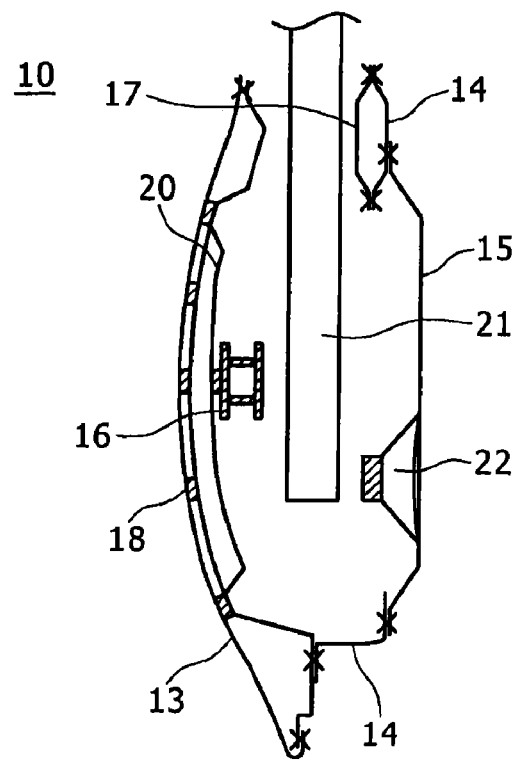
(b)
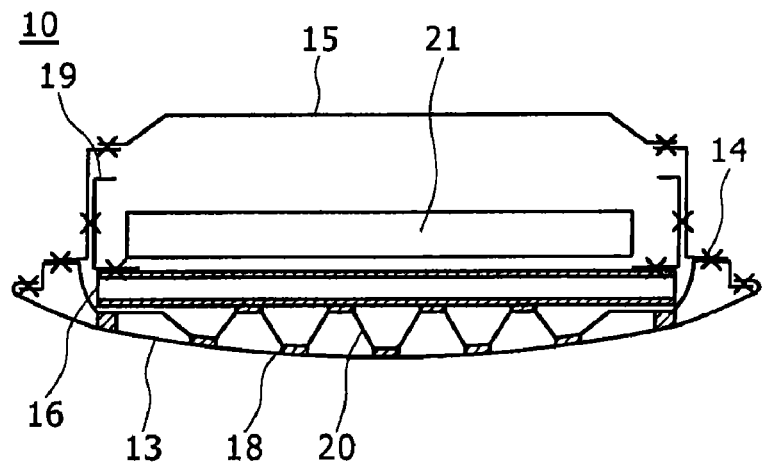

FIG. 7
(a)
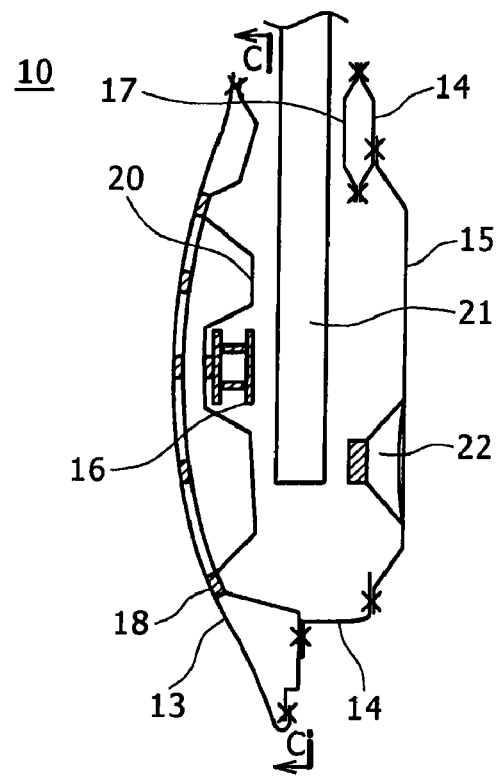
(b)
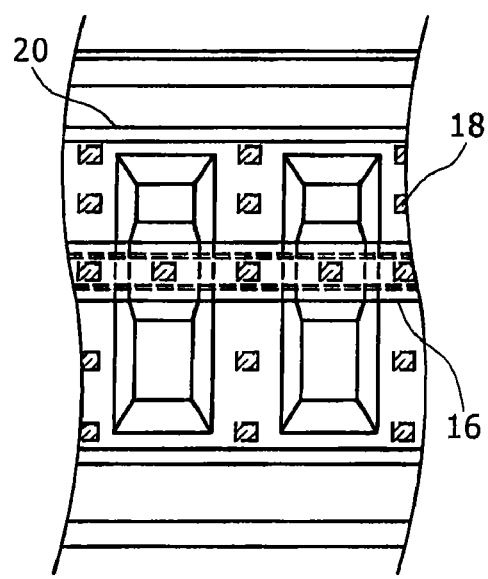

FIG. 8
(a)
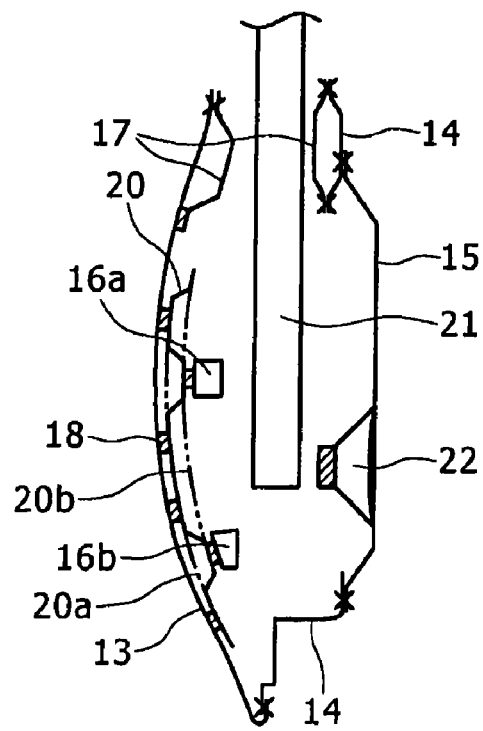
(b)
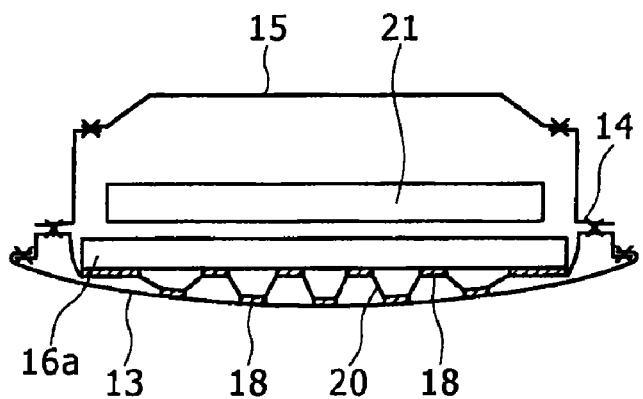

FIG. 10
(a)
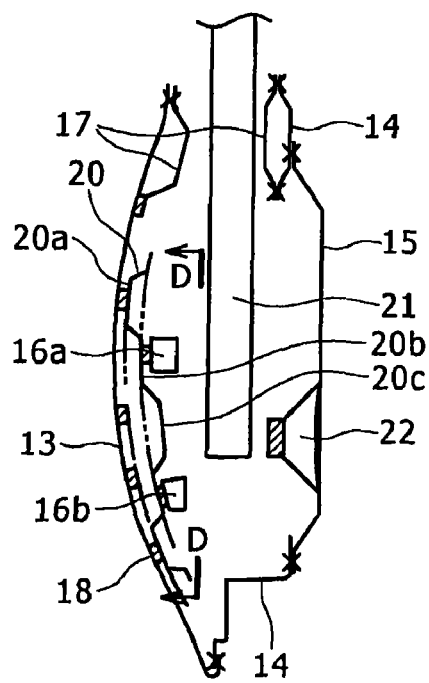
(b)
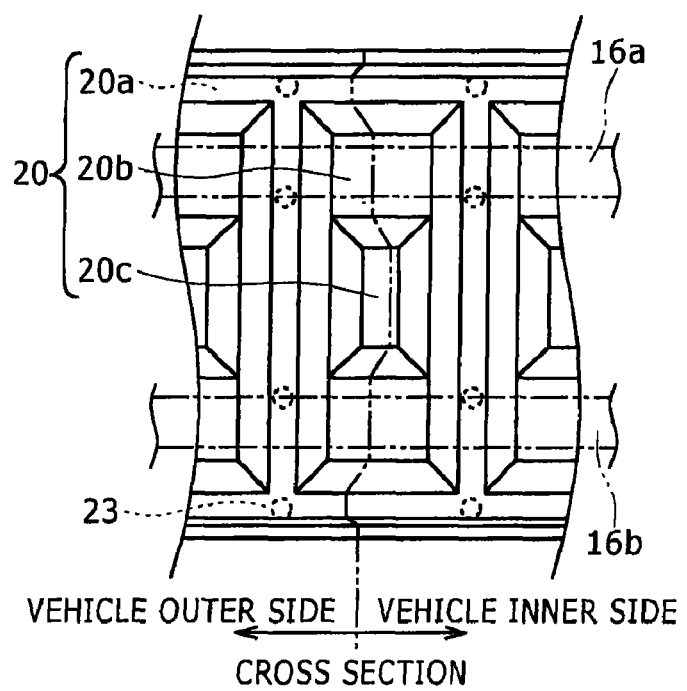
VEHICLE OUTER SIDE | VEHICLE INNER SIDE
CROSS SECTION FIG.11
(a)
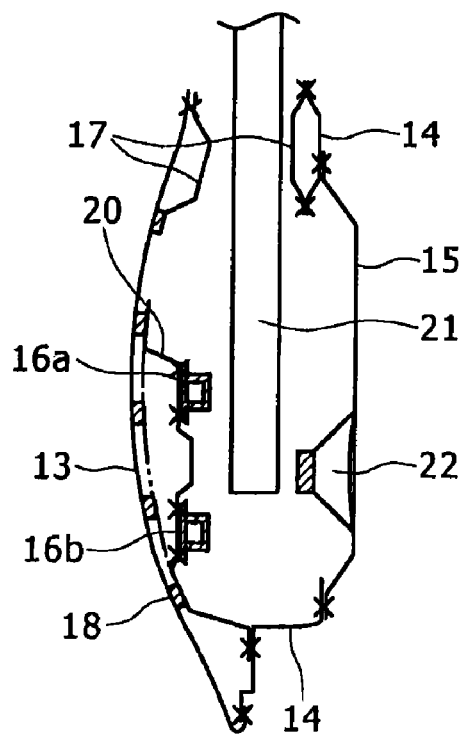
(b)
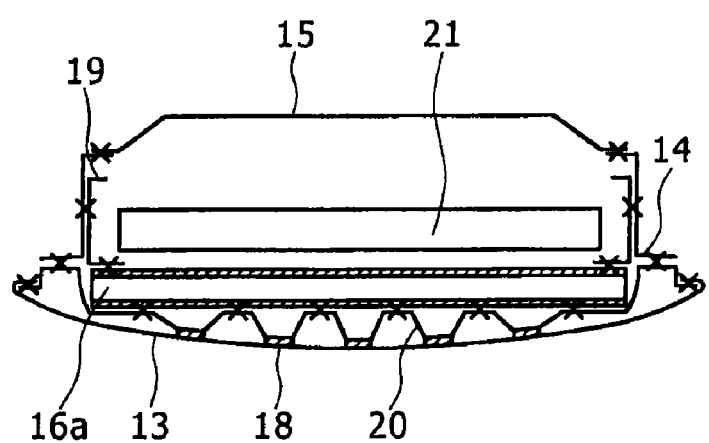

FIG.13
(a)
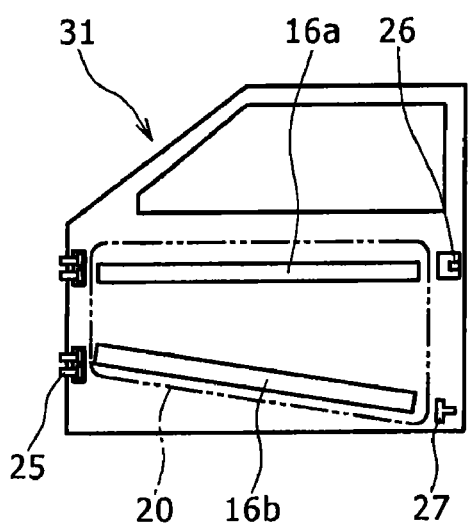
(b)
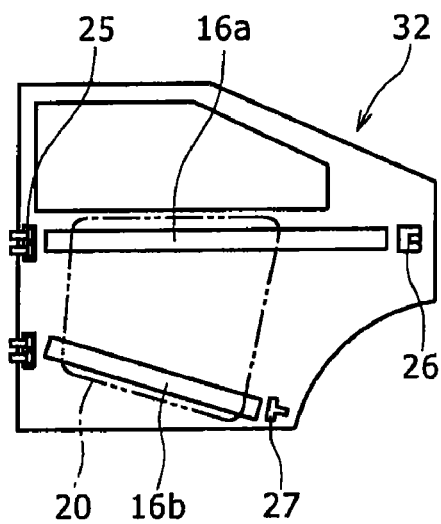
(c)
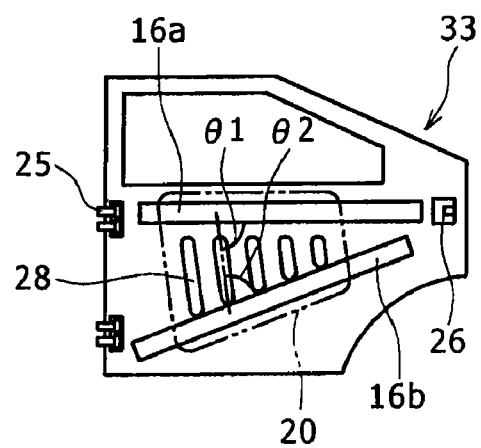

FIG. 14
(a)
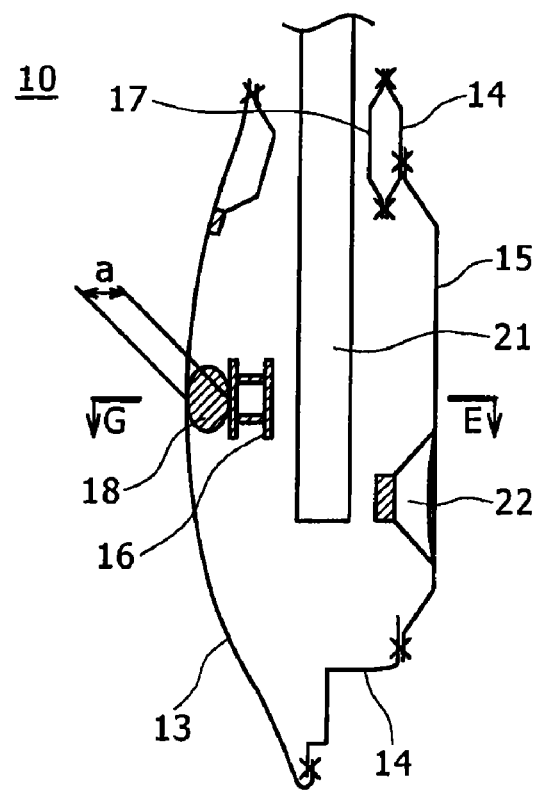
(b)
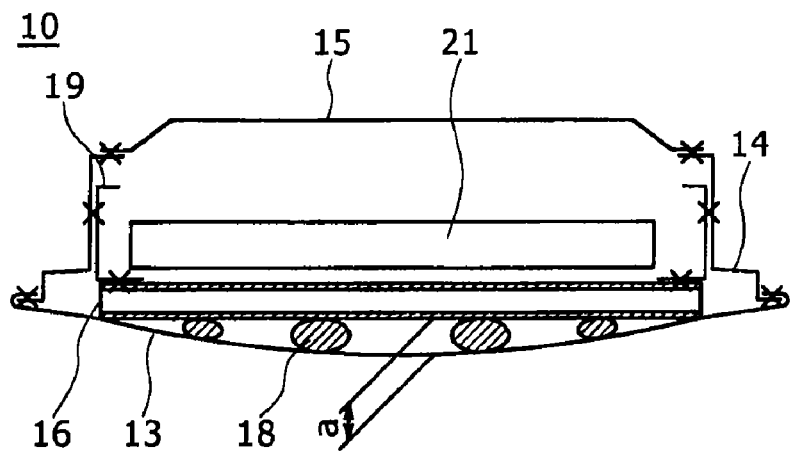

AUTOMOTIVE DOOR WITH ENHANCED SIDE COLLISION PERFORMANCE

CROSS-REFERENCE TO RELATED APPLICATIONS

This application is a continuation of and claims the benefit of priority under 35 U.S.C. §120 from U.S. Ser. No. 12/530,061, filed Sep. 4, 2009, the entire content of which is incorporated herein by reference. U.S. application Ser. No. 12/530,061 is a national stage application of PCT/JP08/054,613 filed Mar. 13, 2008.

This application is also based upon and claims the benefit of priority under 35 U.S.C. §119 from Japanese Patent Application Nos. 2007-095765 filed Mar. 30, 2007, and 2007-197938 filed Jul. 30, 2007.

TECHNICAL FIELD

The present invention relates to an automotive door with enhanced collision performance against a side collision of an automobile.

BACKGROUND ART

In recent years, from the viewpoint of protecting an occupant, the safety standard against the side collision of an automobile have been augmented, and the automotive door is required to exert the side collision performance sufficiently. In order to protect the occupant from the side collision, it is important to reduce the intrusion quantity of a colliding vehicle into the door part and to inhibit deformation of the door toward inside the cabin. In the side collision, the space for absorbing the collision energy is small compared with that in the collision of the front side and rear side. Against such collision, conventionally, a door beam was disposed inside the door along the vehicle traveling direction and deformation of the door toward inside the cabin was inhibited.

At present, a door beam of high tensile steel pipe and pressed material (Patent Document 1) or an aluminum extruded shape (Patent Document 2) has been developed and used. In general, for these door beams, one with a linear shape without a curve is used. In the Patent Document 3, a bending work method is described wherein a dent is not caused on an outside wall in bending in bending work of an extruded shape. Also, in the Patent Document 4, an embodiment is described wherein a door beam of a hollow body having a partitioning wall with a predetermined range being quenched is arranged in a direction oblique to a door.

Patent Document 1: Gazette of the Japanese Unexamined Patent Publication No. H8-216684
Patent Document 2: Gazette of the Japanese Unexamined Patent Publication No. H11-264044
Patent Document 3: Gazette of the Japanese Unexamined Patent Publication No. 2001-71038
Patent Document 4: Gazette of the Japanese Unexamined Patent Publication No. 2001-287608

DISCLOSURE OF THE INVENTION

[Problems to be Solved by the Invention]

As shown in FIGS. 14(a) and (b), in general, an outer panel 13 of a door 10 is curved in the vehicle anteroposterior direction and vertical direction, therefore a gap a is generated between a door beam 16 and the outer panel 13. Conventionally, this gap a was filled with an adhesive 18, and the door beam 16 and the outer panel 13 were mutually adhered.

Therefore, in collision of a vehicle at the door 10, the outer panel 13 did not show strong resistance against the collision load and deformed the gap a, and the gap a could not be utilized effectively as an energy absorbing space. Particularly, in the door 10 wherein the outer panel 13 is curved largely in the longitudinal and vertical direction to make the vehicle of a voluminous design, the gap a between the outer panel 13 and the door beam 16 becomes large.

Further, in recent times, because the collision against a vehicle with high vehicle height and large mass such as an SUV (Sports Utility Vehicle) is assumed and the safety standard is augmented, the height (vehicle vertical direction) dimension of the door beam is required to be enlarged. By this also, the gap described above is liable to further become larger.

In order to reduce the gap a, it is possible to perform bending work on the door beam 16 matching the shape of the outer panel 13 using a method described in the Patent Document 3. However, when unevenness of the outer panel 13 is large, bending work volume of the door beam 16 becomes large, and manufacturing becomes difficult. Even if the bending work is forcibly performed, a wrinkle occurs in the bending work part, buckling is easily caused, and the like, which become the cause of deterioration of the strength of the door beam 16.

Also, when the vehicle collides at a height position shifted from the door beam 16, there is a problem that the intrusion quantity of the colliding vehicle increases and an occupant surviving space inside the vehicle largely decreases. As a countermeasure to it, there is a method described in the Patent Document 4 wherein the door beam 16 is arranged in the oblique direction. However, in general, the fixing span of the door beam 16 becomes long, and twisting deformation is caused in the door beam 16 in collision, therefore, in order to obtain sufficient strength to be able to cope with them, the door beam 16 is required to be enlarged. As a result, the vehicle weight increases bringing the bad influence on the fundamental performance of a vehicle such as deterioration of the fuel economy and the kinematic performance.

The present invention has been developed to solve such problems, and its purpose is to provide an automotive door enhanced with the absorption performance of the collision energy in the side collision.

[Means to Solve the Problems]

In order to achieve the purposes, the present invention is an automotive door constructed of an outer panel and an inner panel, comprising a door beam for a side collision therewithin, and provided with a glass ascending/descending space between the inner panel and the door beam for a side collision, wherein a reinforcing panel disposed in a space between the outer panel and the glass ascending/descending space and joined with both of the outer panel and the door beam for a side collision is provided.

It is preferable that the reinforcing panel has a shape matching the inside shape of the outer panel at least in the vehicle longitudinal direction.

Also, it is preferable that the reinforcing panel has a shape matched with the inside shape of the outer panel in the vehicle anteroposterior direction and vertical direction.

It is preferable that the reinforcing panel is joined with the door beam for a side collision in its face of the vehicle inner side.

Also, it is preferable that the reinforcing panel is joined with the door beam for a side collision in its face of the vehicle outer side.

It is preferable that the reinforcing panel is joined with the inner panel or the outer panel in at least one position in the vicinity of the end part in the upper side, lower side, front side, and rear side.

It is preferable that the reinforcing panel is joined with the outer panel in the end part in the upper side, lower side, front side, and rear side, and the inner panel is joined with the reinforcing panel without extending up to the upper and lower end parts and front and rear end parts of a space formed inside a door.

It is preferable that the reinforcing panel comprises a base part and a protruded part protruding from the base part toward the vehicle inner side.

It is preferable that the reinforcing panel comprises unevenness.
- It is preferable that a difference in the height of the unevenness is larger in a position apart from the door beam than in the vicinity of the door beam.
- It is preferable that the shape of the unevenness is of a bead shape parallel in the vehicle vertical direction or vehicle anteroposterior direction.

It is preferable that a door beam for a side collision is further comprised in addition to the door beam for a side collision and the reinforcing panel is joined with all of the door beams for a side collision.
- It is preferable that all of the door beams for a side collision are arranged so that the longitudinal direction of each becomes the vehicle anteroposterior direction.

It is preferable that the reinforcing panel is joined with one of the door beams for a side collision at a plurality of locations whose position in the vehicle width direction differs with each other.

It is preferable that the door beam for a side collision is arranged so that its both end parts are directed to a door hinge, a door lock, or a stopper restricting intrusion of a door into a cabin in a side collision.

It is preferable that the reinforcing panel comprises unevenness.
- It is preferable that the unevenness is a plurality of beads arranged to be parallel with each other, and the reinforcing panel and the door beams for a side collision are joined with each other so that the angles formed by the beads and each of the door beams for a side collision in their both sides become same.

It is preferable that the reinforcing panel is constructed by any of a steel sheet, a sheet material of aluminum or aluminum alloy, or a fiber-reinforced resin molded article.
- Also, it is preferable that the door beam is constructed by any of a press-formed article of a steel sheet, a steel pipe, or an extruded shape of aluminum or aluminum alloy.

EFFECTS OF THE INVENTION

As described above, according to the present invention, in the initial stage of a side collision, by deformation of the reinforcing panel arranged in the gap between the outer panel and the glass ascending/descending space, the collision energy applied to the outer panel of the automotive door can be absorbed. In other words, this gap can be utilized effectively as the energy absorbing space capable of absorbing the collision energy. Also, in or after the initial stage of the side collision, the reinforcing panel transfers the collision load to the outer panel and the door beam for a side collision joined, and they collectively can resist against the collision load. Accordingly, the collision energy that can be absorbed increases, therefore the maximum intrusion quantity of the colliding vehicle to the door part can be reduced.

Also, by making the unevenness shape of the reinforcing panel in the longitudinal direction the bead shape parallel to the vehicle anteroposterior direction, the compressive deformation strength in the door anteroposterior direction can be increased which becomes effective also for protection of the occupant against a head-on collision.

Further, by making the unevenness shape of the reinforcing panel in the longitudinal direction the bead shape parallel to the vehicle height direction, even when the colliding vehicle collides at the position shifted from the height position of the door beam, the reinforcing panel can transfer the collision load to the door beam which is present in the different position in height.

Furthermore, by making the inner panel join with the reinforcing panel without extending up to the outer panel position in the end part of the door, the depth of the inner panel can be made shallow. Therefore, in the inner panel made of aluminum, the depth of drawing of the inner panel can be made shallow. As a result, the inner panel which conventionally was divided into 2 or 3 can be integrally formed.

In addition, because the reinforcing panel connects two or more door beams, even if the collision position is shifted from the door beam position, the collision load can be transferred to the door beam. Thus, according to the present invention, the automotive door enhanced with the absorption performance of the collision energy in a side collision can be obtained.

BRIEF DESCRIPTION OF THE DRAWINGS

[FIG. 2] A sectional view (a) taken along the line A-A of FIG. 1 of the door part of the first embodiment in accordance with the present invention, and a sectional view (b) taken along the line B-B of FIG. 1.

[FIG. 4] A sectional view (a) taken along the line A-A of FIG. 1 of the automotive door of the second embodiment in accordance with the present invention, and a sectional view (b) taken along the line B-B of FIG. 1.

[FIG. 5] A sectional view (a) taken along the line A-A of FIG. 1 of the automotive door of the third embodiment in accordance with the present invention, and a sectional view (b) taken along the line B-B of FIG. 1.

[FIG. 6] A sectional view (a) taken along the line A-A of FIG. 1 of the automotive door of the fourth embodiment in accordance with the present invention, and a sectional view (b) taken along the line B-B of FIG. 1.

[FIG. 7] A sectional view (a) taken along the line A-A of FIG. 1 of the automotive door of the fifth embodiment in accordance with the present invention, and a sectional view taken along the line C-C of (a).

[FIG. 8] A sectional view (a) taken along the line A-A of FIG. 1 of the automotive door of the sixth embodiment in accordance with the present invention, and a sectional view (b) taken along the line B-B of FIG. 1.

[FIG. 10] A sectional view (a) taken along the line A-A of FIG. 1 of the automotive door of the seventh embodiment in accordance with the present invention, and a sectional view (b) taken along the line D-D of (a).

[FIG. 11] A sectional view (a) taken along the line A-A of FIG. 1 of the automotive door of the eighth embodiment in accordance with the present invention, and a sectional view (b) taken along the line B-B of FIG. 1.

[FIG. 13] A front elevation showing the relative attaching position of the door beam and the reinforcing panel in the automotive door of the tenth embodiment in accordance with the present invention.

[FIG. 14] A sectional view (a) of the automotive door of the conventional construction, and a sectional view (b) taken along the line E-E of (a).

DESCRIPTION OF THE REFERENCE NUMERALS

Figure 1:
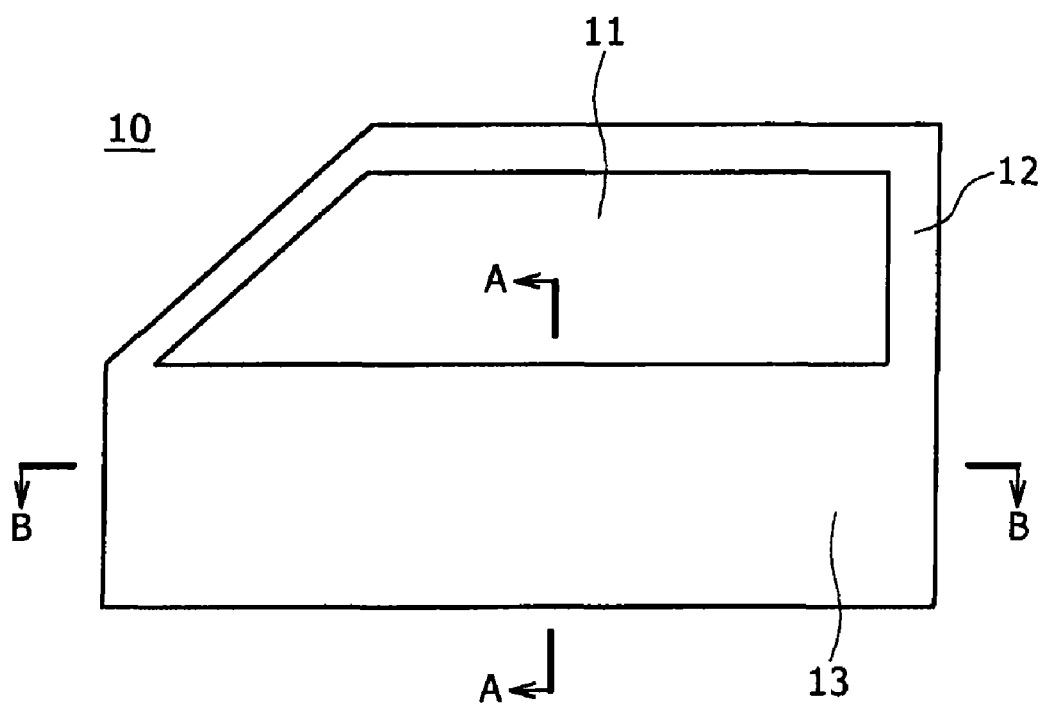
[FIG. 1] A front elevation of a door part of an automobile.

10 . . . Door
11 . . . Window glass
12 . . . Window frame
13 . . . Outer panel
14 . . . Inner panel
15 . . . Interior trim
16 . . . Door beam
16a . . . Upper door beam
16b . . . Lower door beam
17 . . . Reinforcement
18 . . . Adhesive
19 . . . Bracket
20 . . . Reinforcing panel
20a . . . Joining face with outer
20b . . . Joining face with door beam
20c . . . Third face
21 . . . Glass ascending/descending space
22 . . . Speaker
23 . . . Joining position
24 . . . Welding position
25 . . . Hinge
26 . . . Lock
27 . . . Stopper
28 . . . Bead
31 . . . FR door
32, 33 . . . RR door
A . . . Gap

BEST MODE FOR CARRYING OUT THE INVENTION

The automotive door in relation with the embodiments in accordance with the present invention will be described below referring to FIG. 1 to FIG. 13.

FIG. 1 is a front elevation of an automotive door 10 of the left side in the traveling direction of an automobile. In the drawing, the left side is made the front of the automobile, and the upper side is made the upper side of the automobile. There is a window frame 12 above a door frame, and a window can be opened/closed by ascending/descending a window glass 11 arranged in the window frame 12. The door 10 comprises door hinges and a lock disposed in an inner panel described later, and is configured to be attached to a body of the automobile by them.

<First Embodiment>

FIGS. 2(a), (b) are sectional views of the door 10 which is the first embodiment in accordance with the present invention shown in views A-A, B-B in FIG. 1. The door 10 comprises an outer panel 13 arranged outside a cabin, an inner panel 14 arranged inside the cabin, and an interior-furnished interior trim 15. In order to make the automobile of a voluminous design, the outer panel 13 has a shape curved in the anteroposterior direction and vertical direction of a vehicle, and forms a configuration of the door 10. The inner panel 14 is joined with the outer panel 13 of the door 10, and forms a space inside the door 10. The interior trim 15 is furnished with the interior inside the vehicle, is attached with various fixtures such as a knob for opening/closing the door 10 and an open/close button for a glass, and is joined with the inner panel 14. In the formed space inside the door 10, a glass ascending/descending device (not shown) and a glass ascending/descending space 21, a door beam 16, a speaker 22, and the like are disposed. In order to protect an occupant from the side collision of the vehicle, the door beam 16 is disposed along the anteroposterior direction inside the door 10. In the upper part, two reinforcements 17 are arranged and are joined with the outer panel 13 and the inner panel 14. The marks X in the drawing show the positions where the members are joined with each other.

As described above, the outer panel 13 has a shape curved in the anteroposterior direction of the vehicle and the door beam is generally of a linear shape, therefore a gap is generated between the outer panel 13 and the door beam 16. The size of the gap differs in the direction along the door beam 16 according to the curve of the outer panel 13 in the anteroposterior direction. A reinforcing panel 20 is arranged in this gap with the aim of absorbing the collision energy of the side collision. The reinforcing panel 20 comprises a base part and a protruded part protruding from the base part toward the vehicle inner side, wherein the top part of the protruded part and the base part are shaped in the form of a plane. The longitudinal direction of the protruded part is disposed along and close to the disposed direction of the door beam 16. The top part of the extruded part is adhered to the door beam 16, and the base part is adhered to the outer panel 13, intermittently through an adhesive 18.

The door beam 16 is disposed along the vehicle anteroposterior direction and the end parts are joined with brackets 19 for attaching the door beam. The brackets 19 are joined with the inner panel 14 and the collision load is transferred from the door beam 16 to the inner panel 14 through the brackets 19. The reinforcing panel 20 is disposed in the gap between the outer panel 13 and the door beam 16 with the longitudinal direction of the protruded part along a close to the disposing direction of the door beam 16. As described previously, because the dimension of the gap between the outer panel 13 and the door beam 16 differs according to the position of the door beam 16 in the disposing direction, the height difference of the base part and the protruded part of the reinforcing panel 20 disposed is varied matching the dimension of the gap. The protruded part of the reinforcing panel 20 and the door beam 16, reinforcing panel 20 and the outer panel 13 are mutually adhered intermittently by an adhesive.

By disposing the reinforcing panel 20 in the gap between the outer panel 13 and the door beam 16 as shown in FIGS. 2(a), (b), the reinforcing panel 20 can absorb the collision energy transferred to the outer panel by deforming while resisting against the collision load. Conventionally, this gap was merely an idle space not absorbing the collision energy because it resisted little against the collision load. However, in accordance with the present invention, the gap can be utilized effectively as the energy absorbing space.

Figure 3:
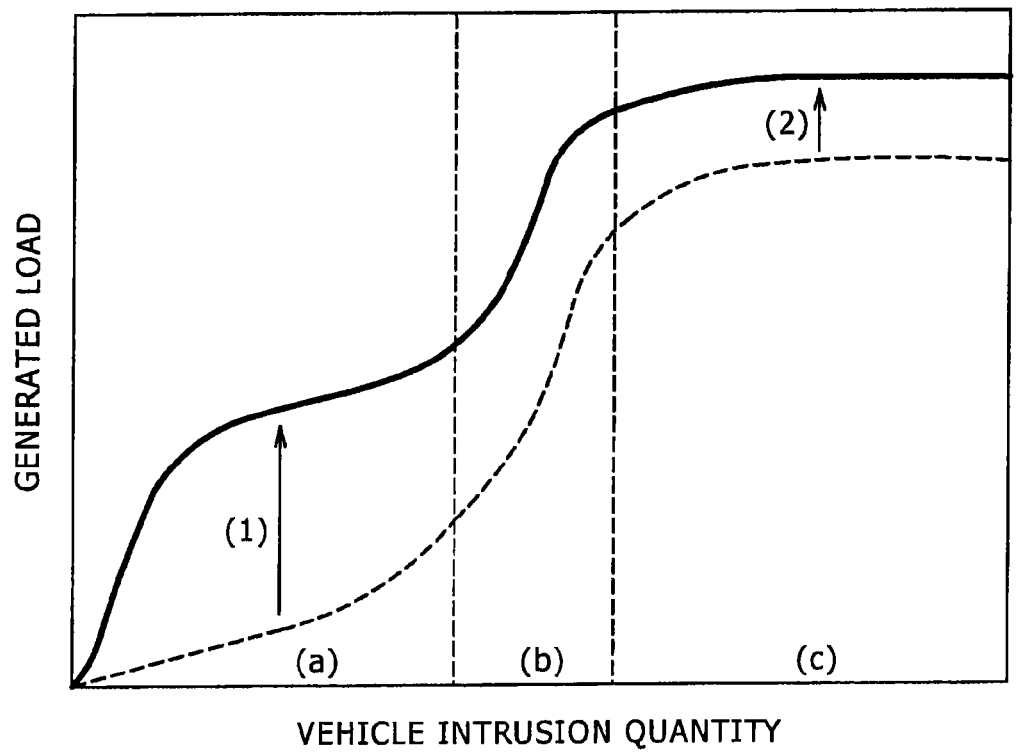
[FIG. 3] A graph representing the relation between the vehicle intrusion quantity and the generated load in the side collision when one door beam is provided.

FIG. 3 is a schematic drawing wherein, in the side collision, the vehicle intrusion quantity to the door 10 part is represented by the horizontal axis and the load required for intrusion of the vehicle to the door 10 part (generated load) is represented by the vertical axis, and the relation between them is shown. The broken line shows the conventional door construction, and the solid line shows the collision performance of the door construction in accordance with the present invention.

In the conventional door construction, the range wherein the generated load against the vehicle intrusion quantity does not increase in the initial stage of the collision (the range of FIG. 3(a)) represents the idle space formed by the gap between the outer panel 13 and the door beam 16.

On the contrary, when the door construction in accordance with the present invention is adopted, increase of the generated load is seen in the initial stage of the collision.

If the vehicle intrusion quantity further increases and the idle space disappears thereafter, the collision load is transferred directly to the door beam 16. Therefore, as the vehicle intrusion quantity increases, the generated load also increases (FIG. 3(b)).

In FIG. 3, even after the intrusion quantity of the vehicle increases further (FIGS. 3(b), (c)) after the initial stage of the collision (FIG. 3(a)) described previously, the generated load can be increased as shown in the arrow (2) shown in FIG. 3 by the reason described previously. Accordingly, the maximum intrusion quantity of the colliding vehicle into the cabin can be reduced.

As described above, by arranging the reinforcing panel 20 shown in FIGS. 2(a), (b), the generated load in the initial stage of the collision can be increased (the arrow (1) in FIG. 2), and the gap part described above can be made the energy absorbing space.

<Second Embodiment>

Although other embodiments will be explained below, the explanation will be done with the corresponding part in respective embodiments being referred to by the same numeral.

FIGS. 4(a), (b) are sectional views of the door 10 which is the second embodiment in accordance with the present invention shown in views A-A, B-B in FIG. 1.

In the present embodiment, as is different from the embodiment shown in FIG. 2, the reinforcing panel 20 is arranged between the glass ascending/descending space 21 and the door beam 16. The reinforcing panel 20 comprises a base part and a protruded part protruding from the base part toward the vehicle inner side, wherein the top part of the protruded part and the base part are shaped in the form of a plane. The longitudinal direction of the protruded part is disposed along and close to the disposed direction of the door beam 16. The back face of the top part of the extruded part is adhered to the door beam 16, and the base part is adhered to the outer panel 13, intermittently through an adhesive 18.

The reinforcing panel 20 is disposed in the gap between the glass ascending/descending space 21 and the door beam 16. Because the dimension of the gap between the outer panel 13 and the glass ascending/descending space 21 differs according to the position responding to the shape of the outer panel, the height difference of the base part and the protruded part of the reinforcing panel 20 disposed is varied matching the dimension of the gap. The door beam 16 is disposed along the vehicle anteroposterior direction and is adhered to the reinforcing panel 20 intermittently by an adhesive.

By enlarging the height difference of the reinforcing panel 20 shown in FIGS. 2(a), (b) as shown in FIGS. 4(a), (b), the stiffness of the reinforcing panel 20 can be enhanced. Accordingly, the resistance against the same deformation quantity of the reinforcing panel 20 increases, and it becomes possible to absorb more collision energy.

However, to the adhesive 18 adhering the door beam 16 and the reinforcing panel 20, the tensile force is mainly applied. Therefore, so that the door beam 16 and the reinforcing panel 20 do not come off easily by the collision of the vehicle, material of the adhesive and the region of adhesion and the like should be studied.

<Third Embodiment>

FIGS. 5(a), (b) are sectional views of the door 10 which is the third embodiment in accordance with the present invention shown in views A-A, B-B in FIG. 1.

In the present embodiment, as is different from the embodiment shown in FIG. 2, the reinforcing panel 20 is arranged in the entire face of the space formed inside the door 10. The reinforcing panel 20 has a plurality of generally parallel uneven parts, and the longitudinal direction of the uneven parts is disposed in the vehicle anteroposterior direction. The "projected part" referred to here is a part protruded toward the vehicle inner side, and the "recessed part" is a part protruded toward the vehicle outer side. The top part of the projected part and the valley part of the recessed part are shaped in the form of a plain, the projected part is adhered to the adjacent door beam 16, and the recessed part is adhered to the outer panel 13, intermittently through the adhesive 18. The reinforcing panel 20 is joined with the outer panel 13 at the upper end inside the door 10 and is joined with the inner panel 14 at the lower end.

The height difference of the uneven parts of the reinforcing panel 20 is determined considering the magnitude of the dimension of the gap against the door beam 16 generated by the curve of the outer panel 13. The reinforcing panel 20 is disposed in the entire face of the space formed inside the door 10, and the front side and the rear side are joined with the inner panel 14 respectively.

By extending the reinforcing panel 20 up to the upper and lower ends and the front and rear ends of the space formed inside the door 10 and joining it with the outer panel 13 and the inner panel 14 as shown in FIGS. 5(a), (b), the collision load is transferred to the outer panel 13 and the inner panel 14 through the end parts of the reinforcing panel 20. Because the reinforcing panel 20 can transfer the collision load, particularly can transfer the stress in the longitudinal direction of the uneven parts, it can transfer the collision force effectively to the inner panel 14 joined with the front and rear ends of the reinforcing panel 20. Therefore, in addition to the energy absorption by the deformation of the reinforcing panel 20 in the initial stage of the collision described previously, the load is transferred to the inner panel 14 connected to the front and rear ends. Also, even after the intrusion quantity of the vehicle has increased further and the collision load has been directly transferred to the door beam 16, the reinforcing panel 20 can continue to resist against the collision load because four sides of the reinforcing panel 20 are fixed.

Furthermore, because the shape of the unevenness of the reinforcing panel 20 is formed in the vehicle anteroposterior direction, the reinforcing panel 20 can resist against the axial force acting in the anteroposterior direction of the vehicle. Therefore, the compressive deformation strength in the anteroposterior direction of the door 10 provided with the reinforcing panel 20 can be increased, which is effective also in protection of the occupant against the head-on collision.

<Fourth Embodiment>

FIGS. 6(a), (b) are sectional views of the door 10 which is the fourth embodiment in accordance with the present invention shown in views A-A, B-B in FIG. 1.

The center part in the height direction of the reinforcing panel 20 is formed with a plurality of uneven parts generally in parallel, and the longitudinal direction of them is formed along the height direction. Also, in the vicinity of the upper and lower ends, the uneven parts are formed in the anteroposterior direction of the vehicle. The reinforcing panel 20 is joined with the outer panel 13 in the upper end inside the door 10, and with the inner panel 14 and the outer panel 13 in the lower end. In the reinforcing panel 20, the top parts of the projected parts of the uneven parts formed in the height direction are adhered to the door beam 16 at their crossing positions by the adhesive 18, and the valley parts of the recessed parts are adhered to the outer panel 13 intermittently by the adhesive 18. Also, the valley parts of the recessed parts formed in the vehicle anteroposterior direction are adhered intermittently to the outer panel 13 by the adhesive 18. The top part and the valley part of the uneven parts are shaped in the form of a plain. Also, the inner panel 14 shown in the lower side inside the door 10 is joined with the reinforcing panel 20, and the reinforcing panel extended up to the lower end of the outer panel 13 is joined with the outer panel 13.

The reinforcing panel 20 is arranged in the entire face of the space formed inside the door 10, and each of the front side and rear side is joined with each of the inner panel 14 and the outer panel 13. The inner panel 14 is joined with the reinforcing panel 20, and the reinforcing panel 20 extended up to the front and rear ends of the outer panel 13 is joined with the outer panel 13.

By directing the longitudinal direction of the uneven parts to the height direction of the vehicle in the center part of the reinforcing panel 20 in the height direction as shown in FIGS. 6(a), (b), the reinforcing panel 20 can transfer the load in the height direction of the vehicle. Even in the side collision of the vehicle shifted from the height position where the door beam 16 is disposed, the reinforcing panel 20 can transfer the collision load effectively to the door beam 16 as described previously. Therefore even in the side collision of the vehicle shifted from the height position where the door beam 16 is disposed, the maximum intrusion quantity of the colliding vehicle can be reduced compared with that in the conventional door construction.

Also, as is similar to the embodiment shown in FIGS. 5(a), (b), the energy absorption performance in the initial stage of the collision can be enhanced compared with that in the conventional door construction, and, even when the intrusion quantity of the vehicle increases, the reinforcing panel 20 can continue to resist against the collision load because the end parts of the reinforcing panel 20 are fixed.

<Fifth Embodiment>

FIG. 7(a) is a sectional view of the door 10 which is the fifth embodiment in accordance with the present invention shown in view A-A in FIG. 1. FIG. 7(b) is a front elevation of the reinforcing panel 20 shown in view C-C in FIG. 7(a).

In the present embodiment, the stiffness of the reinforcing panel 20 is enhanced by making the height difference of the uneven parts formed in the height direction of the reinforcing panel 20 shown in FIGS. 5(a), (b) described previously is made little in the vicinity of the door beam 16, and larger than that in the position apart from the door beam 16.

The portions shown in a square in the center of the drawing are the projected parts formed in the height direction, and their centers match the projected parts of the reinforcing panel 20 in the vicinity of the door beam 16. Also, the straight lines drawn horizontally in the upper part and lower part in the drawing show the uneven parts formed in the anteroposterior direction of the vehicle.

By enlarging the height difference of the uneven parts formed in the height direction shown in the embodiment of FIGS. 5(a), (b) in the position apart from the door beam 16 as shown in FIGS. 7(a), (b), the stiffness of the reinforcing panel 20 can be enhanced. Therefore, the reinforcing panel 20 having the energy absorption performance higher than that of the reinforcing panel 20 shown in FIGS. 5(a), (b) can be realized. However, with regard to the height difference of the uneven parts of the reinforcing panel 20, it is necessary to consider interference with a variety of fixtures arranged inside the door 10 such as the glass ascending/descending space 21.

Although, one door beam is provided in the first to fifth embodiments, an automotive door of an embodiment provided with two door beams will be described below.

FIGS. 8(a), (b) are sectional views of the door 10 which is the sixth embodiment in accordance with the present invention shown in views A-A, B-B in FIG. 1.

In this sixth embodiment, a plurality of the door beams, they are, a door beam 16a and a door beam 16b, are arranged inside the door 10 (here, two beams are arranged in the upper and lower positions, one in the upper side of the automobile is hereinafter referred to as 16a, and one in the lower side is referred to as 16b).

The reinforcing panel 20 made of a steel sheet with unevenness is arranged between the upper and lower door beams 16a and 16b with the aim of absorbing the collision energy generated by the side collision. The reinforcing panel 20 comprises a joining face 20a with the outer matched with the shape of the face of the outer and a joining face 20b with the door beams 16a and 16b, and each of them are joined with the outer panel 13 and the door beams 16a and 16b by the adhesive 18. Also, at least in the vehicle anteroposterior sides, the edge parts of the reinforcing panel 20 and the inner panel 14 are joined.

As shown in FIG. 8(b), the door beam 16a is disposed along the vehicle anteroposterior direction, and its end parts are joined with the inner panel 14 through the reinforcing panel 20. Because the door beams 16a and 16b are of a generally linear shape, a gap is generated between the door beams 16a and 16b and the outer panel 13 of a shape curved in the anteroposterior direction of the vehicle. Here, because the dimension of the gap between the outer panel 13 and the door beam 16a differs according to the position of the door beam 16a in the disposing direction, the unevenness of the reinforcing panel 20 disposed has the height difference matched with the dimension of the gap. Also, although only the upper door beam 16a is illustrated in FIG. 8(b), same thing can be said on the lower door beam 16b as well.

In the side collision against the door 10 in accordance with the present embodiment, the collision energy from another vehicle (colliding vehicle) is transferred to the inside of the door 10 from the outer panel 13. At that time, the reinforcing panel 20 absorbs the collision energy by deformation while resisting against the collision load. Also, two door beams 16a and 16b joined with the reinforcing panel 20 receive the collision load in a planar manner, resist against the bending load, and inhibit intrusion of the door; and the collision load is transferred to the inner panel 14 and the body from the door beam 16a through the reinforcing panel 20. Thus, the door and the body integrally resist the intrusion of the door to the inside of the vehicle by the collision load.

Figure 9:
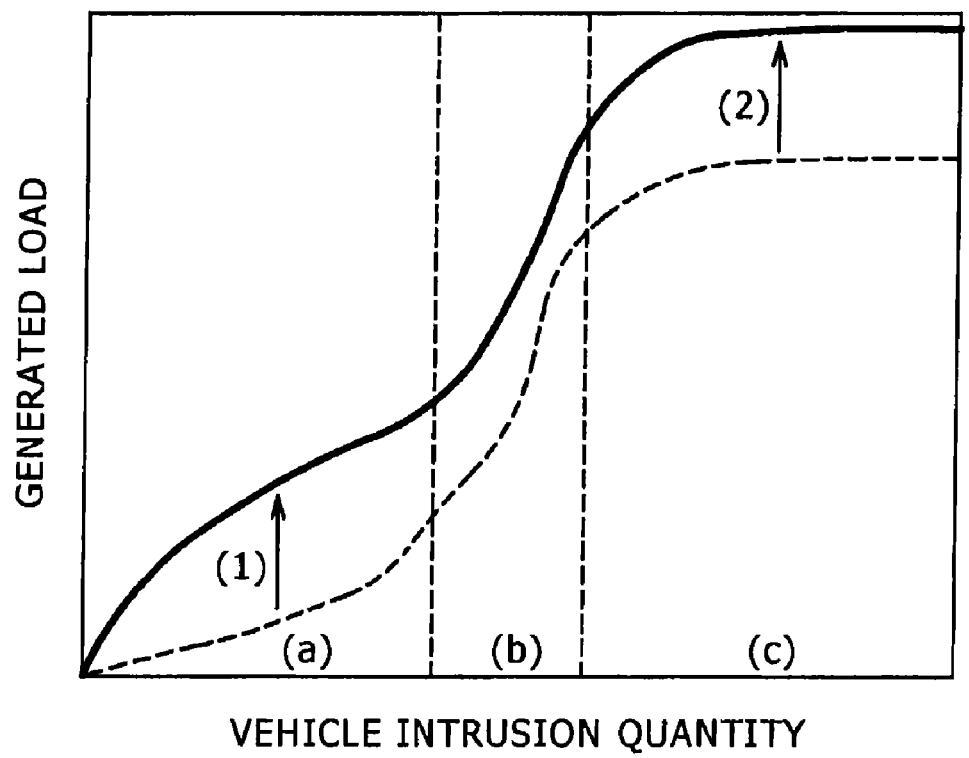
[FIG. 9] A graph showing the relation between the vehicle intrusion quantity and the generated load in the side collision of the automotive door provided with two door beams

Similar to FIG. 3, FIG. 9 is a schematic drawing exhibiting the relation between the intrusion quantity of the colliding vehicle and the generated load in the side collision. The conventional door construction is one wherein two door beams equivalent to the door beam in accordance with the present embodiment shown in FIG. 8 are disposed toward the vehicle traveling direction, and the gap between the outer panel and the door beams is filled with the adhesive.

The range of FIG. 9(a) represents the idle space by the gap between the outer panel 13 and the door beams 16a and 16b. In the conventional door construction, in the range (a), the increment of the generated load against the increment of the vehicle intrusion quantity is comparatively little. Thereafter, when the vehicle intrusion quantity increases going beyond the idle space, the door beams receive the collision load, therefore the increment of the generated load increases against the increment of the vehicle intrusion quantity as shown in FIG. 9(b). When the vehicle intrusion quantity increases further, the generated load does not vary much against the increment of the vehicle intrusion quantity as shown in FIG. 9(c).

On the other hand, in the door construction in accordance with the present embodiment, even in the range of FIG. 9(a), the generated load larger than that in the conventional door construction is shown from immediately after the vehicle intrusion. This means that the collision energy is absorbed efficiently by deformation of the reinforcing panel disposed between the outer panel and the door beams.

Thereafter, when the vehicle intrusion quantity increases and the idle space disappears, the collision load is transferred directly to the door beams 16a and 16b (FIG. 9(b)). In the conventional door construction, because the door beams were arranged solely, torsional deformation easily occurred in the beams, and efficient energy absorption was not possible. According to the present embodiment, because two door beams are connected by the reinforcing panel, the effect that each door beam inhibits the torsional deformation of the other door beam is generated. Therefore, because the structural body of the door beams and the reinforcing panel integrally receives the collision load in a planar manner, the collision energy can be absorbed efficiently. As a result, the generated load against the vehicle intrusion quantity can be increased compared with that in the conventional construction.

Thereafter, when the vehicle intrusion quantity increases further, the generated load does not vary much against the increment of the vehicle intrusion quantity similarly to the conventional door construction as shown in FIG. 9(c). However, in the door construction in accordance with the present embodiment, the collision energy is absorbed efficiently from the initial stage of the collision as described previously, therefore, the generated load increases compared with that in the conventional construction as shown in the arrow (2). In other words, the automotive door in accordance with the present embodiment can reduce the maximum intrusion quantity to a vehicle against the external collision load compared with that in the conventional construction.

As described above, in the present embodiment, by arranging the reinforcing panel 20 between the outer panel 13 and the door beams 16a and 16b, the generated load in the initial stage of the collision can be increased. In other words, the gap between the outer panel 13 and the door beams 16a and 16b can be made the energy absorbing space. Also, because the collision load is transferred from the reinforcing panel 20 to the body through the inner panel 14, the collision load applied to the door can be distributed.

Also, in the present embodiment, two door beams are disposed along the anteroposterior direction of the vehicle. Although the energy can be absorbed efficiently when the door beam is arranged in the position closest possible to the outer, if the vehicle height dimension of the door beam is large, the gap becomes too large, therefore it is effective to provide two door beams. Also, in the present embodiment, in the wide range of the gap between the outer panel 13 and the door beams 16a and 16b, the reinforcing panel 20 having a cubical shape is disposed and is joined with the adjacent structural body. Thus, even when the collision takes place in a position where the door beam is not present, the load can be transferred efficiently to the door beams 16a and 16b through the reinforcing panel 20. Also, by connecting the two door beams by the reinforcing panel, the two door beams are interacted, the torsional deformation and the like are inhibited, and efficient energy absorption becomes possible.

Further, in the present embodiment, the door beams are made of a press-formed article of a steel sheet, and the reinforcing panel is made of a steel sheet. Thus, because the door beams and the reinforcing panel are constructed with parts whose elastic modulus is comparatively large, the increment of the load in the initial stage of the deformation can be made large, and the collision energy can be absorbed efficiently.

Also, the reinforcing panel 20 may be constructed, for example, to have the unevenness of one-directional bead shape along the traveling direction or the vertical direction of the vehicle, matching the shape or the like of the outer panel 13.

<Seventh Embodiment>

FIG. 10(a) is a sectional view of the door 10 which is the seventh embodiment in accordance with the present invention shown in view A-A in FIG. 1. FIG. 10(b) is a front elevation of the reinforcing panel 20 shown in view D-D in FIG. 10(a).

As shown in FIG. 10(a), the automotive door in accordance with the present embodiment is based on the construction of FIG. 8, wherein the bead for further improving the stiffness is provided with the door beam in the vehicle inside side on the joining face 20b. The reinforcing panel 20 shown in FIG. 10(a) comprises, in the order from the side of the outer toward the side of the inner, the joining face 20a with the outer, the joining face 20b with the door beam, and the third face 20c, respectively constructed with the bead. Also, in the joining faces 20a, 20b and 20c, each bead face can be constructed with the height of the unevenness matched with the shape of the member of their counterpart.

As shown in FIG. 10(b), the joining face with the outer (face of the vehicle outer side) 20a is the bead matching the outer and extending in the vehicle vertical direction, and forms a flange extending in the vehicle anteroposterior direction in the upper side of the upper door beam 16a. The joining face 20a by this bead is varied in its height to match the shape of the outer and is joined with the outer at, for example, the joining positions 23 by the adhesive. Also, in the joining face 20b with the door beam, the reinforcing panel 20 and the door beams 16a and 16b are joined. With regard to the joining method, a variety of methods can be adopted as will be described below. Also, in FIG. 10 (b), the door beams 16a, and 16b are illustrated in two-dot chain lines for convenience sake. As shown in the two-dot chain line representing the cross section in FIG. 10(b), the third face 20c is the bead arranged in innermost side of the vehicle. Also, the position of the third face 20c is disposed not to interfere with the various fixtures arranged inside the door 10 such as the glass ascending/descending space 21.

In the present embodiment, the stiffness of the reinforcing panel 20 can be enhanced by providing the bead by the third face 20c on the reinforcing panel 20. Accordingly, the collision energy absorption effect of the reinforcing panel described in the first embodiment can be further improved.

<Eighth Embodiment>

FIGS. 11(a), (b) are sectional views of the door 10 which is the eighth embodiment in accordance with the present invention shown in views A-A, B-B in FIG. 1.

As shown in FIG. 11(a), in the automotive door in accordance with the present embodiment, the reinforcing panel 20 is extended to the lower side of the door beam 16b, and its edge part is joined with the inner panel 14. If the reinforcing panel 20 is extended and is joined with the inner panel 14 thus, the consolidation of the reinforcing panel 20 and the inner panel 14 is enhanced, and the collision load is transferred to the body parts such as a locker resisting against the collision load. Therefore, because the absorbable collision energy increases, the maximum intrusion quantity of the colliding vehicle to the door part can be reduced. Also, by joining the edge part of the reinforcing panel 20 with the inner panel 14, the outer panel 13, the inner panel 14 and the reinforcing panel 20 constitute a closed cross section, thereby the energy absorption efficiency in the wider region can be improved. Accordingly, even when the vehicle suffers the side collision shifting from the height position where the door beams 16*a* and 16*b* are disposed, the maximum intrusion quantity of the colliding vehicle can be reduced compared with that in the conventional door construction.

Also, in the present embodiment, because the door beams 16*a* and 16*b* have a flange for joining, both face joining such as spot welding and rivet joint with the reinforcing panel can be easily performed.

Also, in the present embodiment, the door beam 16*a* is joined with the inner panel 14 through the brackets 19. Thus, the attaching portions in the front and rear ends of the door beam 16*a* become stronger, therefore the inhibiting effect of the torsional deformation of the door beam 16*a* can be further improved. Also, although only the upper door beam 16*a* is illustrated in FIG. 11 (*b*), same thing can be said on the lower door beam 16*b* as well.

<Ninth Embodiment>

Figure 12:
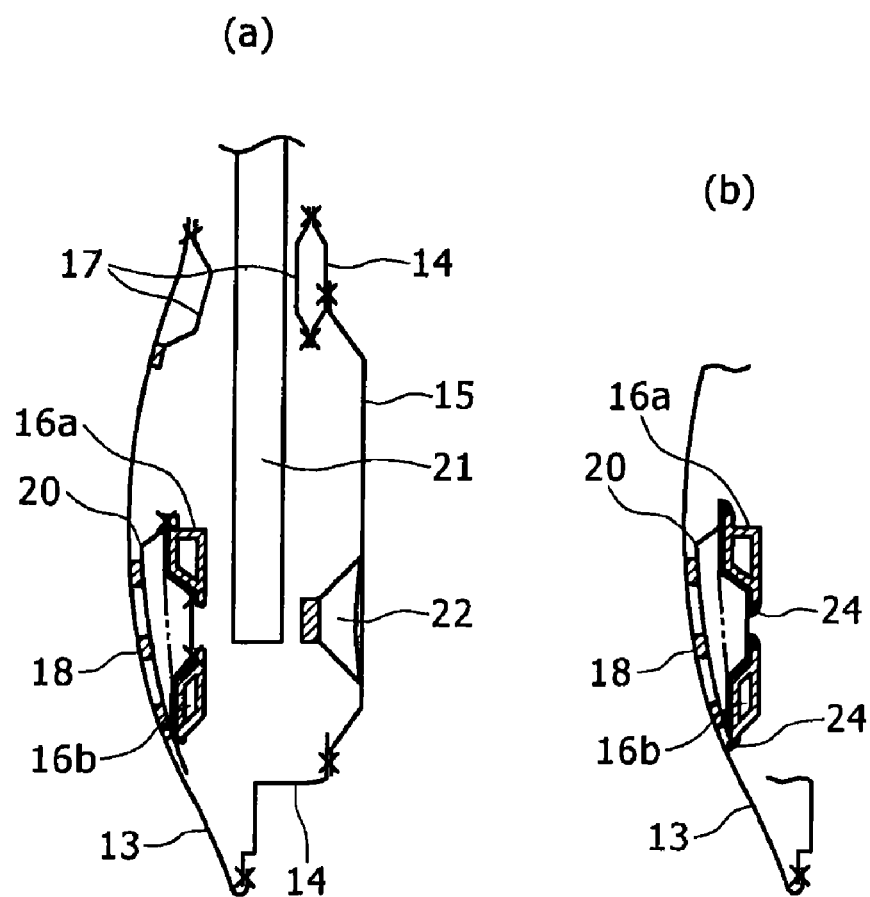
[FIG. 12] A sectional view (a) taken along the line A-A of FIG. 1 of the automotive door of the ninth embodiment in accordance with the present invention, and a sectional view (b) showing its variation.

FIG. 12(*a*) is a sectional view of the door 10 which is the ninth embodiment in accordance with the present invention shown in view A-A in FIG. 1, and FIG. 12(*b*) is a variation of FIG. 12 (*a*).

As shown in FIG. 12(*a*), in the automotive door in accordance with the present embodiment, the flanges for joining the reinforcing panel 20 are arranged in the outer side and the inner side of the door beams 16*a* and 16*b*, and are performed with both face joining with the reinforcing panel 20 in the positions offset in the vehicle width direction. Also, the door beams 16*a* and 16*b* have the cross section inclined to match the gradually narrowing shape of the bead part of the reinforcing panel 20. Further, the reinforcing panel 20 has a closed cross section constructed by, for example, the welded construction, or the like.

In the present embodiment, a plurality of the joining positions for one door beam against the reinforcing panel 20 are offset in the vehicle width direction. Thus, the rotation restricting force of the reinforcing panel 20 and the door beams 16*a* and 16*b* increases, and the torsional deformation of the door beams 16*a* and 16*b* can be inhibited effectively. In other words, the collision energy can be absorbed more efficiently.

Also, in FIG. 12(*a*), both face joining is performed between the door beams 16*a* and 16*b* and the reinforcing panel 20, however they may be joined by, for example, one side welding such as arc welding and laser welding, with the flanges eliminated or shortened as shown in FIG. 12(*b*).

<Tenth Embodiment>

FIGS. 13(*a*), (*b*), (*c*) are drawings showing the relation of the attaching positions of the door beams and the reinforcing panel in the automotive door in relation with the tenth embodiment in accordance with the present invention.

As shown in FIGS. 13(*a*) to (*c*), FR (front side) door 31 and RR (rear side) doors 32 and 33 are attached to the body parts such as a pillar by hinges 25 and a lock 26. Also, the FR door 31 and the RR door 32 are provided with a stopper 27 for restricting the intrusion of the door into the cabin in the side collision in the lower side of the RR side (lock side) of the door. Further, the hinges 25, the lock 26 and the stopper 27 are disposed in the inner panel of the door. The upper door beam 16*a* is disposed in the inner panel by, for example, the brackets so that its both ends are directed to the hinge 25 and the lock 26. The lower door beam 16*b* is disposed so that its both ends are directed to the hinge 25 and the stopper 27 in the FR door 31 and the RR door 32, and so that its both ends are directed to the hinge 25 and the lock 26 in the RR door 33. Furthermore, in order to efficiently transfer the collision load from the door beams 16*a*, 16*b* to the inner panel, both ends of the door beams 16*a* and 16*b* are attached to be positioned in the vicinity of the hinges 25, the lock 26 and the stopper 27.

In the present embodiment, the door beams 16*a* and 16*b* are attached so that their both end parts are positioned in the vicinity of the hinges 25, the lock 26 or the stopper 27. Thus, the collision load in the side collision is transferred from the door beams 16*a* and 16*b* to the body through the door hinges 25, the door lock 26 and the stopper 27, therefore the energy absorption performance can be further improved.

Also, in the RR door 33 shown in FIG. 13(*c*), the reinforcing panel 20 comprises a plurality of beads 28 which are generally parallel with each other and are in the vertical direction of the vehicle. Further, they are attached so that the angles formed by the beads 28 and each of the door beams 16*a* and 16*b* become generally same ($\Theta 1 \approx \Theta 2$). Thus, the door beams 16*a* and 16*b* can be connected with each other so that the distance of the beads become shortest, therefore the stiffness of the reinforcing panel 20 can be improved.

Further, in the FR door 31, the reinforcing panel 20 is disposed in the region covering all of the door beams 16*a* and 16*b*, however, in view of the yield or the like, it may be disposed in the region covering only a part of the door beams 16*a* and 16*b* as in the RR doors 32 and 33. In this case, the end parts of the door beams 16*a* and 16*b* not covered by the reinforcing panel 20 can transfer the load received by the door beams 16*a*, 16*b* to the inner panel by being joined with the inner panel by, for example, the brackets or the like.

As described above, in respective embodiments in accordance with the present invention, the reinforcing panels 20 comprising several kinds of the uneven parts were exemplified. However, the present invention is not to be limited to only the exemplified embodiments, but the height of the uneven parts can be set freely in the uneven parts of the bead type, and it is possible to change the longitudinal direction of the uneven parts and to change the interval of the uneven beads. Also, with regard to the shape of the unevenness, it is possible to freely set the angle of the inclined face connecting the top part and the valley part of the unevenness and the radius of the edge line of each uneven bead, and a variety of shapes such as a cone type or a concentric shape or the like can be adopted.

Although several examples of the embodiments in accordance with the present invention were described, the type of the reinforcing panel adopted changes according to the characteristics of the automobile to which it is attached, and there is also an automobile wherein, for example, the attaching brackets 19 for the door beam are not present. In that case, the optimal type of the reinforcing panel can be selected considering the frame construction of the automobile and the various fixtures inside the door 10 and the like.

Further, in respective embodiments in accordance with the present invention, the adhesive is used for joining the reinforcing panel and the outer panel, however, for joining them and joining the reinforcing panel and the door beam, joining by a variety of methods may be performed such as the fusion welding like the arc welding, spot welding, laser welding, electron beam welding, or the friction stir welding, rivet joint, mechanical caulking fastening, hemming work using an adhesive, or the like.

Furthermore, in respective embodiments in accordance with the present invention, two door beams 16a and 16b are used, however the present invention is not to be limited to it. Three or more of the door beams, for example, may be disposed considering the conditions such as the size of the door, increase of the mass, and the like.

In addition, in all of the first to tenth embodiments described above, the door beam is preferably constructed by any of a press-formed article of a steel sheet, a steel pipe, or an extruded shape of aluminum or aluminum alloy, and the reinforcing panel is preferably constructed by any of a steel sheet, a sheet material of aluminum or aluminum alloy, or a fiber-reinforced resin molded article.

The invention claimed is:

1. An automotive door comprising:
   an inner panel;
   an outer panel spaced outwardly from the inner panel to define a glass ascending/descending space in the door between the outer panel and the inner panel, the outer panel having a portion that is concave in the direction of a height of the door, whereby the outer panel extends farthest outward from the inner panel at a certain height position of the door;
   a door beam for reinforcing the door against a side collision provided in the space at a height position substantially corresponding to the certain height position of the door; and
   a reinforcing panel in the space and joined with both the outer panel and the door beam,
   wherein the reinforcing panel has a surface facing the inside surface of the outer panel and joined with the outer panel, said surface of the reinforcing panel having a shape continuously matching the shape of the inside surface of the outer panel in the vehicle anteroposterior direction, along the entire length of the reinforcing panel in the vehicle anteroposterior direction.

2. The automotive door according to claim 1 wherein the reinforcing panel is joined to the door beam at a side of the door beam facing the outer panel.

3. The automotive door according to claim 1 wherein the reinforcing panel is joined to the outer panel at ends of the reinforcing panel in the vehicle anteroposterior direction, and at ends of the reinforcing panel in the direction of a height of the door.

4. The automotive door according to claim 1 wherein the reinforcing panel comprises undulations.

5. The automotive door according to claim 4 wherein the undulations extend in the vehicle anteroposterior direction.

* * * * *